Dec. 14, 1954  L. G. KERSTA  2,697,157
ELASTIC CONDUCTOR
Filed April 10, 1952

INVENTOR
L. G. KERSTA
BY Harry C. Hart
ATTORNEY

United States Patent Office 2,697,157
Patented Dec. 14, 1954

2,697,157

ELASTIC CONDUCTOR

Lawrence G. Kersta, Millburn, N. J., assignor to Bell Telephone Laboratories, Inc., New York, N. Y., a corporation of New York Application April 10, 1952, Serial No. 281,620

6 Claims. (Cl. 201—63)

This invention relates to elastic conductors.

In certain situations a need exists for the properties of mechanical extensibility and electrical conductivity in one and the same element. Such a situation is found in the submarine cable art in which extensibility is desirable in a cable which lies across two spaced high points on the ocean floor in order that it shall also lie on the ocean floor between them and therefore not be strained by its own weight. Another situation is found in connection with the standard subscriber's telephone set in which case the subscriber needs from time to time to extend the cord which interconnects the hand set with the desk set in reaching for a book or the like. Provision of an inextensible telephone cord of a length sufficient to meet all such needs would be both expensive and awkward.

It is well known to construct an extensible cable by the device of winding an inextensible conductor such as a length of copper wire in spiral form about an elastic nonconductor such as a rubber cord. This construction is expensive and is open to the objection that the copper wire may deteriorate from the repeated bending which takes place when the composite cord is elongated.

The present invention provides an elastic conductor in which both the mechanical extensibility and the electrical conductivity are provided by one and the same member. In particular, it provides a telephone cord or other cable which is fabricated of conductive rubber.

It has long been known that by the incorporation of appropriate quantities of a suitable material such as carbon black, powdered metal, or the like, butyl rubber may be rendered electrically conductive without sacrifice of its mechanical extensibility. However, it is characteristic of this material that a thread, cord or cable of it suffers a substantial reduction of its electrical conductivity when it is mechanically elongated. This renders it unsuitable for most purposes, and in particular for a telephone cord.

The present invention is based on the discovery that another material, polysulfide rubber, may also be rendered electrically conductive by the incorporation into its structure of appropriate amounts of carbon black or other suitable substance, and that polysulfide rubber of this composition is characterized by an increase of its conductivity with elongation. In a preferred form, therefore, the invention provides a composite conductor constructed in part of conductive butyl rubber and in part of conductive polysulfide rubber, the proportions being preferably so adjusted that the positive variation of conductivity of the one component with elongation is balanced by the negative variation of conductivity of the other. In the simplest form two threads, strands, or strips of these respective materials may be connected in parallel and held together by wrapping or cementing. In another form, a solid core of one of these materials may be surrounded by a sheath of the other. It may be fabricated, for example, by first forming a solid cord of one material and repeatedly dipping it into a liquid mixture of the other, withdrawing it, allowing it to dry, and repeating the operation until the sheath of the outer material has been formed with the required thickness.

As many individual composite elastic strands may be formed into a single cord or cable as the need requires. The telephone subscriber's set utilizes three conductors which are individually insulated from each other. In accordance with the invention, each of these conductors may be one of the composite elastic conductors of the invention, individually insulated, the three being then formed into a single cable enclosure in a loose sleeve of braided fabric or otherwise as desired.

The invention will be fully apprehended from the following detailed description of an illustrative embodiment thereof, taken in connection with the appended drawings, in which.

Figure 1:
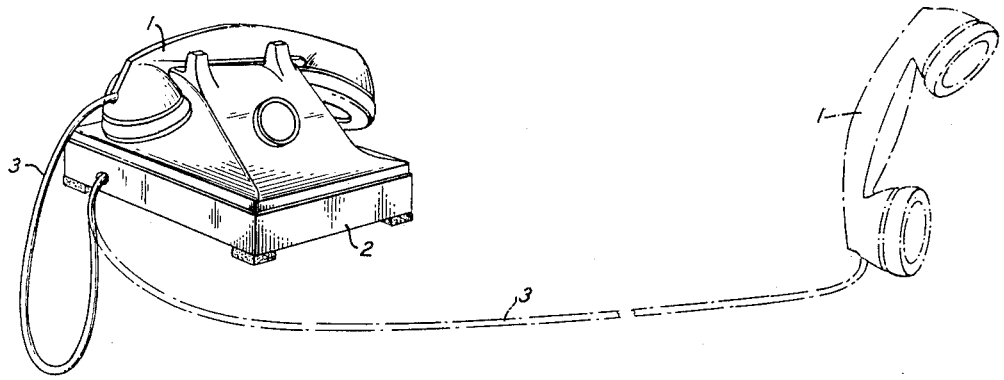
Fig. 1 shows a telephone subscriber's set provided with an extensible telephone cord in accordance with the invention.
Figure 4:
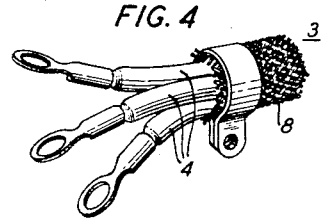
Fig. 4 is a side view of one end of the cord of Fig. 3.

Fig. 1 depicts a conventional telephone subscriber's set in which the hand set 1 is connected to the desk set 2 by way of a cable 3 formed of three extensible composite conductors in accordance with the invention. The individual conductors may be tied together as with a loose sleeve of braided fabric. Inside of the desk set and the hand set, respectively, the individual conductors may be clamped to the terminals to which they require to be connected in well-known fashion. Suitable clamping lugs are shown in Fig. 4. The cord 3 is shown in its retracted condition by solid lines and its extended condition by broken lines. The new cord may be extended by a factor of two or more without producing an alteration in its resistance of a magnitude which is noticeable to the subscriber.

Figure 2:
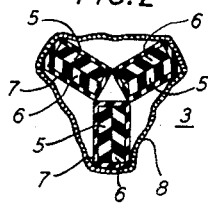
Fig. 2 is a cross sectional view of the telephone cord of Fig. 1, showing one arrangement of its extensible conductors.

Fig. 2 is an enlarged cross section view of the telephone cord 3 of Fig. 1 in which each of the three conductors 4 is formed of a pair of parallel strips of conductive rubber, one member 5 of each pair being of butyl rubber and the other 6 of polysulfide rubber. The two members of each pair may be cemented together in well-known fashion and the composite conductor 4 may be peripherically insulated as by a skin 7 of nonconductive rubber, the three conductors being then tied together as with the braided fabric sleeve 8.

Figure 3:
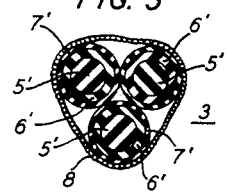
Fig. 3 is a cross sectional view showing an alternative to Fig. 2.

Fig. 3 is a cross sectional view of the cord of Fig. 1 in which each of the individual components 4' comprises a circular core 5' of one material, e. g., butyl rubber, and a surrounding sheath 6' of the other material such as polysulfide rubber. Each such composite conductor 4' may be fabricated by first forming a cord or thread of the inner material by any well-known process such as extrusion from a liquid mixture, and then repeatedly dipping this cord or thread into a liquid mixture of the other material and then withdrawing it with a liquid film adhering to it. The film is allowed to dry and the dipping process is repeated. The composite conductor is complete when the films so successively formed have acquired in the aggregate the thickness required of the sheath.

Figure 5:
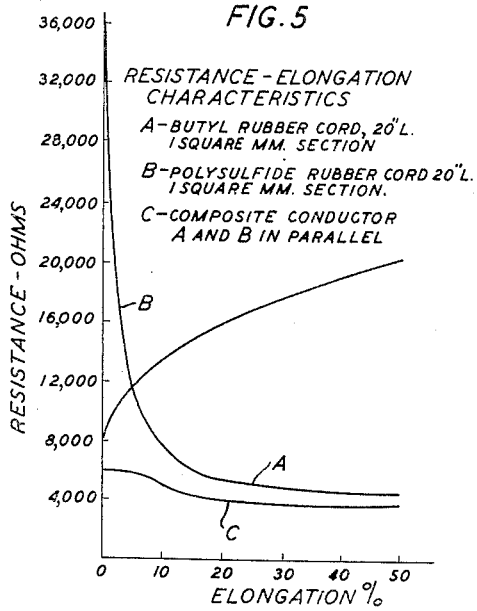
Fig. 5 is a set of graphs showing the variation with elongation of the resistance of the several components of the composite conductor of the invention and the substantial independence of elongation of the composite conductor as a whole.

In the graphs of Fig. 5, the curve A shows the electrical resistance of a cord of butyl rubber of 20 inches unextended length and 1 square millimeter cross section and the variation of this resistance with elongation of the cord. The curve B shows the electrical resistance and its variation for a similar cord of polysulfide rubber of the same length and of the same cross section. The curve C shows the same characteristics for a composite conductor formed in accordance with the invention by connecting the two individual components in parallel and preferably cementing them together. It is evident that the resistance of the composite conductor varies from 6000 ohms to slightly less than 4000 ohms as the conductor is elongated by as much as 50 per cent, achieved by the exertion of a pull of 13 ounces. Such a variation of resistance is virtually unnoticed by a telephone subscriber since it produces a variation in attenuation considerably less than that produced by the normal slight displacement of the speaker's mouth from the microphone. At the same time the elongation of 50 per cent permits him to reach across the desk for a pencil, a reference book or the like, without the annoyance of a cord which is long to begin with.

Figure 6:
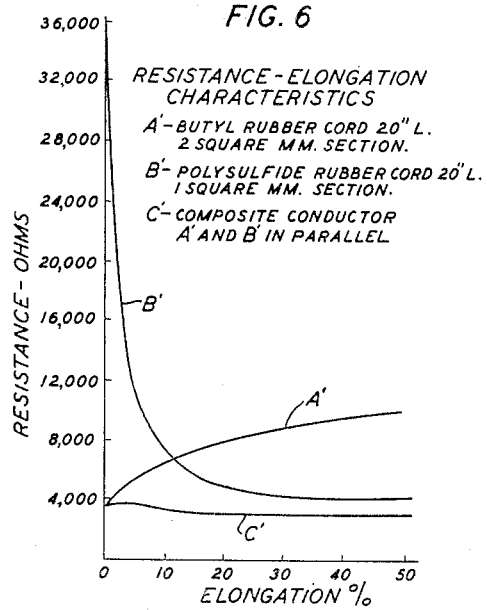
Fig. 6 is a similar set of graphs for a composite conductor whose components are of unequal cross sections.

By making the butyl rubber component of a somewhat larger cross sectional area than the polysulfide rubber component, the effect of the butyl rubber component becomes the predominant one with the result that the composite characteristic curve C slopes downward to a much less extent or not at all. Thus, Fig. 6 shows a set of similar curves A', B' for a composite conductor of which the butyl rubber component is of 2 millimeters cross section and the polysulfide rubber component is of 1 millimeter cross section. It will be observed that the composite curve C' shows a resistance which is almost entirely independent of elongation. The 50 per cent elongation shown is achieved with a pull of about 18 ounces.

The mean value of the resistance of the composite conductor of the curve C of Fig. 5 is about 5000 ohms and that of the curve C' of Fig. 6 is about 3000 ohms. Either of these resistances is of course many times larger than that of the conductors of which telephone cords are conventionally fabricated. However, the employment of a high impedance microphone and a high impedance receiver or the employment of impedance matching transformers with a conventional microphone and a receiver entirely disposes of any objectionable features which these high resistances may have.

Fabrication

The butyl rubber component may be fabricated by well-known techniques that are referred to for example in the Electrical Review for June 3, 1938, at page 800, and in British Patent 396,891, August 17, 1933. The chemistry of the polysulfide rubber component is less generally known. One form which the polysulfide rubber may take is a tough, solid, elastic material manufactured by a process of curing a base material which is the subject of United States Patent 2,466,963, issued April 12, 1949, to Joseph C. Patrick and H. R. Ferguson and assigned to Thiokol Corporation. This material is manufactured and sold in the liquid state by Thiokol Corporation under the trade name "Thiokol Liquid Polymer LP-2." It is fully described in a technical bulletin of the same name prepared by the manufacturer. The chemical composition of the final product, the ingredients of which and the process by which it is fabricated are described below.

Thiokol Liquid Polymer LP-2 is a polymer having a molecular weight of approximately 4000 and a viscosity of 400 poises at 25 degrees centigrade. The average structure for the polymer is as follows:

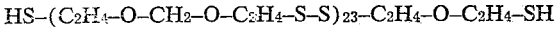

$$HS-(C_2H_4-O-CH_2-O-C_2H_4-S-S)_{23}-C_2H_4-O-C_2H_4-SH$$

Occasionally in the chain of recurring units there is a side mercaptan group. Its chemical reactivity is slightly acidic in its pure state and is stable. In an alkaline medium it polymerizes rapidly in accordance with the formula:

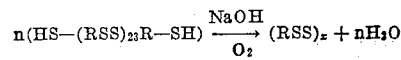

$$n(HS-(RSS)_{23}R-SH) \xrightarrow[O_2]{NaOH} (RSS)_x + nH_2O$$

where R denotes the group

$$(C_2H_4-O-CH_2-O-C_2H_4)$$

It forms unstable sodium mercaptide and rapidly oxidizes to a high polymer.

To manufacture the polysulfide rubber there are first formed independently three separate liquid mixtures of which the ingredients and the proportions, in parts by weight, are as follows:

Mixture No. 1 (base compound)—
  100 LP-2 Thiokol polymer
  25 carbon black No. 1.
  25 carbon black No. 2.
  3 zinc peroxide
  104 cyclohexanone
  104 methyl ethyl ketone
Mixture No. 2 (accelerator No. 1)—
  40 flowers of sulfur
  60 Vinylite "VYHH" (20% solution in methyl ethyl ketone)

Mixture No. 3 (accelerator No. 2)—
  20 diphenyl guanidine
  80 methyl ethyl ketone Carbon black No. 1 is a fine furnace black, manufactured and sold under the name "Statex B" by Binney and Smith Company. It has a pH value of 9 and specific gravity of 1.80. It serves to impart tensile strength, toughness, and electrical conductivity.

Carbon black No. 2 is another fine furnace black which is manufactured and sold under the name "Sterling 105" by Godfrey L. Cabot, Inc. Its electrical conductivity is high. The principal reason for selecting this particular blend of carbon blacks of two different makes is that it results in improved life, elasticity, durability and the like, faster cure, and better spraying properties.

Zinc peroxide is used as a stabilizer and curing agent. The action is that of counteracting acidity. Without zinc peroxide the film tends to soften and to decompose at high temperatures. With zinc peroxide the film is stable at 212 degrees Fahrenheit.

Cyclohexanone is employed as an ingredient of the solvent combination because it is an excellent solvent for LP-2.

Methyl ethyl ketone is employed as an ingredient of the solvent combination because it makes for good spraying and drying properties. It is only a fair solvent for LP-2 but its weakness in solvent properties is compensated by the use of cyclohexanone.

The sulfur employed is preferably of high quality. It is ground fine and dispersed in the Vinylite solution. The sulfur is believed to act principally as a catalyst during conversion although some sulfur may combine directly. The methyl ethyl ketone is employed for dissolving the Vinylite and it becomes a part of the solvent combination. Vinylite "VYHH" is a copolymer of vinyl chloride (87 per cent) and vinyl acetate (13 per cent). It is manufactured and sold under the trade name "Vinylite VYHH" by Bakelite Corporation. It is employed for the sake of its good sulfur-dispersing properties and is deposited as an inert, water insoluble product.

Diphenyl guanidine provides an alkaline environment which promotes oxidation.

Two separate accelerator mixtures are employed because sulfur and diphenyl guanidine tend to interact if intimately mixed.

The final mixture for spraying or dipping is made by adding 4 parts by weight of Mixture No. 2 (accelerator No. 1) and 2.5 parts of Mixture No. 3 (accelerator No. 2) to 250 parts of the base compound, Mixture No. 1. The resulting composite mixture is unstable, and should be utilized without delay. It may be sprayed onto a cold flat surface to form a film of the desired thickness, e. g., one-sixteenth of an inch. This film dries rapidly and may be peeled off the surface as a sheet of tough, elastic, stable, conductive polysulfide rubber. This sheet may now be cut into strips of the desired width, e. g., one millimeter. If preferred, the composite mixture may be employed in its liquid form, as by repeatedly dipping a thread or cord of conductive butyl rubber into it to form on this cord a surrounding sheath of conductive polysulfide rubber.

What is claimed is:

1. A longitudinally extensible composite conductor formed of two elastic conductive members connected in parallel, said first member being characterized by a positive variation of its resistance with elongation, said second member being characterized by a negative variation of its resistance with elongation which tends to offset the positive variation of the resistance of said first member with elongation, whereby the variation of the resistance of said composite conductor as a whole as it is extended is substantially less than that of either of its component members.

2. A composite conductor as defined in claim 1 wherein the negative resistance variation of the second member is of a magnitude such as substantially to offset the positive resistance variation of the first member, whereby the resistance of said composite conductor as a whole remains substantially constant when extended.

3. A composite conductor as defined in claim 1 wherein the first member is composed of conductive butyl rubber and the second member is composed of conductive polysulphide rubber.

4. A composite conductor as defined in claim 3 wherein the individual members are independently fabricated strips, said strips being laterally cemented together to form the composite conductor.

5. A composite conductor as defined in claim 3 wherein one of said members is a core formed of one of said materials and extending axially of said composite conductor while the other of said members is a sheath formed of the other of said materials adhering to and surrounding said core.

6. A telephone cord comprising a plurality of individually insulated composite conductors, each of said composite conductors being formed of two elastic members connected in parallel, the first of said members comprising conductive butyl rubber characterized by a positive variation of resistance with elongation, the second of said members comprising conductive polysulfide rubber characterized by a negative variation of resistance with elongation, whereby the variation of the resistance of each of said composite conductors, and therefore of said telephone cord as a whole, as they are extended, is substantially less than that of any of its component members.

References Cited in the file of this patent

UNITED STATES PATENTS

| Number | Name | Date |
|---|---|---|
| 2,142,625 | Zoethout | Jan. 3, 1939 |
| 2,234,068 | Wiseman | Mar. 4, 1941 |
| 2,304,210 | Scott et al. | Dec. 8, 1942 |
| 2,343,442 | Bertalan et al. | Mar. 7, 1944 |
| 2,351,459 | Shann | June 13, 1944 |
| 2,408,416 | Edgar et al. | Oct. 1, 1946 |